United States Patent
Loomis (10) Patent No.: US 10,339,557 B2
(45) Date of Patent: *Jul. 2, 2019

(54) SYSTEMS AND METHODS FOR PROVIDING OFFERS USING A MOBILE DEVICE

(71) Applicant: CAPITAL ONE FINANCIAL CORPORATION, McLean, VA (US)

(72) Inventor: Daniel Loomis, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,237

(22) Filed: Nov. 20, 2018

(65) Prior Publication Data

US 2019/0087850 A1 Mar. 21, 2019

Related U.S. Application Data

(63) Continuation of application No. 15/875,297, filed on Jan. 19, 2018, now Pat. No. 10,163,123, which is a continuation of application No. 15/703,745, filed on Sep. 13, 2017, now Pat. No. 10,019,725, which is a continuation of application No. 15/395,651, filed on Dec. 30, 2016, now Pat. No. 9,785,963, which is a continuation of application No. 15/373,213, filed on Dec. 8, 2016, now Pat. No. 9,741,052, which is a continuation of application No. 15/231,746, filed on Aug. 8, 2016, now Pat. No. 9,558,504, which is a continuation of application No. 14/492,883, filed on Sep. 22, 2014, now Pat. No. 9,412,118.

(51) Int. Cl.
| | |
|---|---|
| *G06Q 30/02* | (2012.01) |
| *G06Q 20/32* | (2012.01) |
| *G06F 16/22* | (2019.01) |
| *G06F 16/29* | (2019.01) |
| *G06F 16/951* | (2019.01) |
| *G06Q 20/20* | (2012.01) |
| *G06Q 20/38* | (2012.01) |
| *H04W 4/021* | (2018.01) |

(52) U.S. Cl.
CPC ......... *G06Q 30/0239* (2013.01); *G06F 16/22* (2019.01); *G06F 16/29* (2019.01); *G06F 16/951* (2019.01); *G06Q 20/20* (2013.01); *G06Q 20/3224* (2013.01); *G06Q 20/3278* (2013.01); *G06Q 20/387* (2013.01); *G06Q 30/0207* (2013.01); *G06Q 30/0222* (2013.01); *G06Q 30/0224* (2013.01); *G06Q 30/0238* (2013.01); *G06Q 30/0252* (2013.01); *G06Q 30/0253* (2013.01); *G06Q 30/0261* (2013.01); *G06Q 30/0264* (2013.01); *G06Q 30/0267* (2013.01); *G06Q 30/0268* (2013.01); *H04W 4/021* (2013.01)

(58) Field of Classification Search
CPC ........... G06Q 30/0239; G06Q 30/0252; G06Q 30/0238; G06Q 30/0264; G06Q 20/387; G06Q 30/0222; G06Q 20/3278; G06Q 20/20; G06Q 20/3224; G06Q 30/0224; G06Q 30/0207; G06Q 30/0268; G06Q 30/0267; G06Q 30/0261; G06Q 30/0253; G06F 16/951; G06F 16/22; G06F 16/29; H04W 4/021

See application file for complete search history.

(56) References Cited

U.S. PATENT DOCUMENTS

| | | |
|---|---|---|
| 4,674,041 A | 6/1987 | Lemon et al. |
| 5,202,826 A | 4/1993 | McCarthy |
| 5,627,549 A | 5/1997 | Park |
| 5,832,457 A | 11/1998 | O'Brien et al. |
| 5,905,246 A | 5/1999 | Fajkowski |
| 6,018,718 A | 1/2000 | Walker et al. |
| 6,129,274 A | 10/2000 | Suzuki |
| 6,292,786 B1 | 9/2001 | Deaton et al. |
| 6,314,406 B1 | 11/2001 | O'Hagan et al. |
| 6,434,534 B1 | 8/2002 | Walker et al. |
| 6,587,835 B1 | 7/2003 | Treyz et al. |
| 6,684,195 B1 | 1/2004 | Deaton et al. |
| 6,694,300 B1 | 2/2004 | Walker et al. |
| 6,925,565 B2 | 8/2005 | Black |
| 6,965,868 B1 | 11/2005 | Bednarek |
| 7,006,983 B1 | 2/2006 | Packes, Jr. et al. |
| 7,426,480 B2 | 9/2008 | Granger et al. |
| 7,546,254 B2 | 6/2009 | Bednarek |
| 7,934,639 B1 | 5/2011 | Chen et al. |
| 9,412,118 B2 | 8/2016 | Loomis |

(Continued)

FOREIGN PATENT DOCUMENTS

WO WO 01/39053 A2 5/2001

OTHER PUBLICATIONS

Deals2Buy®, Deals2buy: Everyday hot deals and coupons, retrieved from the internet at http://www.deal2buy.com, retrieved from the internet on Feb. 9, 2007, 27 pages.

(Continued)

*Primary Examiner* — Christle I Marshall
(74) *Attorney, Agent, or Firm* — Finnegan, Henderson Farabow, Garett & Dunner, LLP (57) ABSTRACT

A wireless device is enabled to provide offers. The wireless device receives card data for a financial account card and stores the card data in a memory associated with the wireless device. Responsive to using the card data in a transaction at a first merchant location, the wireless device receives transaction line-item data from a computing system associated with the first merchant location. The wireless device determines merchant information for a second merchant location and determines an offer associated with the second merchant location based on the line-item data and the merchant information for the second merchant. The wireless device presents the offer when the wireless device is near the second merchant location.

20 Claims, 8 Drawing Sheets

(56) References Cited

U.S. PATENT DOCUMENTS

| | | | |
|---|---|---|---|
| 9,558,504 B2 | 1/2017 | Loomis | |
| 9,741,052 B2 | 8/2017 | Loomis | |
| 9,785,963 B2 | 10/2017 | Loomis | |
| 10,019,725 B2* | 7/2018 | Loomis | G06F 16/22 |
| 10,163,123 B2* | 12/2018 | Loomis | G06F 16/22 |
| 2001/0014870 A1 | 8/2001 | Saito et al. | |
| 2002/0010629 A1 | 1/2002 | Diamond | |
| 2002/0042743 A1 | 4/2002 | Ortiz et al. | |
| 2002/0042774 A1 | 4/2002 | Ortiz et al. | |
| 2002/0049631 A1 | 4/2002 | Williams | |
| 2002/0091571 A1 | 7/2002 | Thomas et al. | |
| 2002/0152123 A1 | 10/2002 | Giordano et al. | |
| 2002/0198021 A1 | 12/2002 | Boesen | |
| 2003/0063072 A1 | 4/2003 | Bradenberg et al. | |
| 2003/0105667 A1 | 6/2003 | Millikan | |
| 2003/0163373 A1 | 8/2003 | Cornateanu | |
| 2003/0205617 A1 | 11/2003 | Allen et al. | |
| 2003/0216967 A1 | 11/2003 | Williams | |
| 2003/0220835 A1 | 11/2003 | Barnes, Jr. | |
| 2004/0024638 A1 | 2/2004 | Restis | |
| 2004/0030601 A1 | 2/2004 | Pond et al. | |
| 2004/0058717 A1 | 3/2004 | McDonnell et al. | |
| 2004/0064365 A1 | 4/2004 | Sjoblom et al. | |
| 2004/0083170 A1 | 4/2004 | Bam et al. | |
| 2004/0117250 A1 | 6/2004 | Lubow et al. | |
| 2004/0138947 A1 | 7/2004 | McGee et al. | |
| 2004/0143500 A1 | 7/2004 | Lopez et al. | |
| 2004/0143501 A1 | 7/2004 | Lopez et al. | |
| 2004/0230487 A1 | 11/2004 | Trip | |
| 2004/0260608 A1 | 12/2004 | Lewis et al. | |
| 2005/0010475 A1 | 1/2005 | Perkowski et al. | |
| 2005/0055270 A1 | 3/2005 | Broe | |
| 2005/0075927 A1 | 4/2005 | Nash | |
| 2005/0108096 A1 | 5/2005 | Burger et al. | |
| 2005/0149394 A1 | 7/2005 | Postrel | |
| 2005/0216337 A1 | 9/2005 | Roberts et al. | |
| 2005/0267812 A1 | 12/2005 | Jensen et al. | |
| 2006/0011719 A1 | 1/2006 | Lehtonen et al. | |
| 2006/0173781 A1 | 8/2006 | Donner | |
| 2006/0178986 A1 | 8/2006 | Giordano et al. | |
| 2006/0237531 A1 | 10/2006 | Heffez et al. | |
| 2007/0198432 A1 | 8/2007 | Pitroda et al. | |
| 2008/0011837 A1 | 1/2008 | Wesley | |
| 2008/0035724 A1 | 2/2008 | Vawter | |
| 2008/0133339 A1 | 6/2008 | Drakoulis et al. | |
| 2011/0010229 A1 | 1/2011 | Ow | |
| 2011/0208659 A1 | 8/2011 | Easterly | |
| 2011/0258117 A1 | 10/2011 | Ahmad | |
| 2013/0046602 A1 | 2/2013 | Grigg | |
| 2014/0006207 A1 | 1/2014 | Koelling | |
| 2014/0058796 A1 | 2/2014 | Getchius | |
| 2014/0172537 A1 | 6/2014 | Weigman | |
| 2015/0100405 A1 | 4/2015 | Lee | |
| 2016/0086217 A1 | 3/2016 | Loomis | |
| 2016/0350786 A1 | 12/2016 | Loomis | |
| 2017/0109779 A1 | 4/2017 | Loomis | |
| 2018/0005260 A1 | 1/2018 | Loomis | |

OTHER PUBLICATIONS

Epinions.com: a Shopping.com Company, Reviews from Epinions, retrieved from the internet at http://www.epinions.com, retrieved from the internet on Feb. 9, 2007, 4 pages.

eDealinfo.com, eDealinfro.com—Daily Hot Deals with Proce Comparison, Online Coupons, Rebates, Gift Ideas, retrieved from the internet at http://www.eadealinfo.com, retrieved from the internet on Feb. 9, 2007, 26 pages.

U.S. Appl. No. 13/069,785 to Lianghan Chen et al. entitled "System and Method of Notifying User Near Point of Sale Location of Available Rewards at the Point of Sale Location" filed Mar. 23, 2011.

* cited by examiner

SYSTEMS AND METHODS FOR PROVIDING OFFERS USING A MOBILE DEVICE

PRIORITY CLAIM

This application is a continuation of, and claims the benefit of priority to, U.S. patent application Ser. No. 15/875,297, filed Jan. 19, 2018, which is a continuation of U.S. patent application Ser. No. 15/703,745, filed Sep. 13, 2017 (now U.S. Pat. No. 10,019,725, issued Jul. 10, 2018), which is a continuation of U.S. patent application Ser. No. 15/395,651, filed Dec. 30, 2016 (now U.S. Pat. No. 9,785,963, issued Oct. 10, 2017), which is a continuation of U.S. patent application Ser. No. 15/373,213, filed Dec. 8, 2016 (now U.S. Pat. No. 9,741,052, issued Aug. 22, 2017), which is a continuation of U.S. patent application Ser. No. 15/231,746, filed Aug. 8, 2016 (now U.S. Pat. No. 9,558,504, issued Jan. 31, 2017), which is a continuation of U.S. patent application Ser. No. 14/492,883, filed Sep. 22, 2014(now U.S. Pat. No. 9,412,118, issued Aug. 9, 2016). The disclosures of all of the above-referenced applications are expressly incorporated herein by reference in their entireties.

BACKGROUND

In a conventional credit card transaction, a credit card holder presents a financial account card, such as a credit card or debit card, to a merchant. The merchant typically swipes a magnetic stripe on the card through a card reader that is built into or attached to a point-of-sale (POS) terminal. The magnetic stripe generally includes account information, such as an account number of the card, an identity of the card holder, and an expiration date of the card. Once the merchant has swiped the card through the card reader, the account information is transmitted to the POS terminal. Alternatively, instead of the merchant swiping the card, the credit card holder may personally swipe the card at a self-service check out station or may insert the card into a card reader built into, for example, a gasoline pump. Once the card reader has read the card data, the card data is transmitted over a secure network, authenticated, and ultimately used to authorize a transaction. In any of these kinds of transactions, however, the credit card must be physically read by a magnetic stripe reader in order to obtain the card data that is stored on the magnetic stripe.

As the prevalence of wireless devices continues to increase, new methods of storing and transmitting credit card data have begun to emerge. One such example is to use RFID (radio frequency identification) tags for transmitting payment information. RFID tags are microchips, some versions of which may store and encrypt data. Others may receive and transmit data from a processor. An RFID tag acts as a transponder and is capable of transmitting a radio frequency signal when the RFID tag receives a query radio signal from another device. Typically, the other device is an RFID reader that sends a query signal requesting a nearby RFID tag to transmit data to the RFID reader. When the RFID tag receives the query signal, the RFID tag may be powered into an "on" state. Alternatively, the RFID tag may have its own independent power supply. In either case, when an RFID tag receives a query radio signal, the RFID tag may respond by transmitting data to the reader up to a distance of a several inches or feet away, depending upon the power capabilities of the RFID tag.

In recent years, RFID tags have been incorporated in wireless devices, such as cellular phones. In addition to cellular phones, other wireless devices, such as PDAs, for example, are also being equipped with RFID tags. There are many possibilities regarding the kinds of information that an RFID tag may store and transmit. One type of information that an RFID tag may transmit is card data that provides payment information for a transaction. For example, a transaction may involve providing information for an account, such as a credit card account. In the example of a cellular phone, the card data may be securely transmitted using encryption techniques to an RFID reader when the cellular phone is placed in close proximity to the RFID reader. Accordingly, a cellular phone storing credit card data in an RFID tag or in a memory accessible by an RFID tag may be used as a payment device without requiring the actual credit card to be swiped by a magnetic card reader. Some wireless devices may also transmit information wirelessly using other technology such as Bluetooth, Wi-Fi, near field communication (NFC), and cellular technologies such as CDMA, TDMA, LTE, GSM, for example.

SUMMARY

Consistent with disclosed embodiments, a method is provided for providing offers using a mobile device. The method includes receiving card data for a financial account card and storing the card data in a memory associated with a wireless device. Responsive to using the card data in a transaction at a first merchant location, the method also includes receiving transaction line-item data from a merchant computing system associated with the first merchant location. The method further includes determining merchant information for a second merchant location and determining an offer associated with the second merchant location based on the line-item data and the merchant information for the second merchant. Then, the method presents the offer when the wireless device is near the second merchant location.

Also, consistent with disclosed embodiments, a wireless device is described that provides offers. The wireless device receives card data for a financial account card and stores the card data in a memory associated with the wireless device. Responsive to using the card data in a transaction at a first merchant location, the wireless device receives transaction line-item data from a computing system associated with the first merchant location. The wireless device determines merchant information for a second merchant location and determines an offer associated with the second merchant location based on the line-item data and the merchant information for the second merchant. The wireless device presents the offer when the wireless device is near the second merchant location.

Further, a non-transitory computer readable medium is disclosed that stores instructions that cause one or more processors to perform operations. The operations include receiving card data for a financial account card and storing the card data in a memory associated with a wireless device. Responsive to using the card data in a transaction at a first merchant location, the operations also include receiving transaction line-item data from a merchant computing system associated with the first merchant location. The operations further include determining merchant information for a second merchant location and determining an offer associated with the second merchant location based on the line-item data and the merchant information for the second merchant. Then, the offer is presented when the wireless device is near the second merchant location.

It is to be understood that both the foregoing general description and the following detailed description are exemplary and explanatory only and are not intended as restrictive.

BRIEF DESCRIPTION OF THE DRAWINGS

The accompanying drawings, which are incorporated in and constitute a part of this specification, illustrate embodiments consistent with the disclosure. In the drawings.

DESCRIPTION OF EMBODIMENTS

The use of wireless devices such as cellular phones provides a more interactive transaction experience than what is capable using a traditional financial account card with a magnetic stripe. As wireless devices include processors and memory and components for wireless communication with other computer systems, they can be configured to communicate with one or more merchant systems during a transaction. For example, during a transaction, a wireless device can receive information about the transaction, such as line-item transaction data describing the goods or services that are part of the transaction, or information about the merchant itself, such as the merchant's Merchant Category Code (MCC), name, address, or other descriptive information.

The ability for the wireless device and the merchant computing system, such as POS terminal, to communicate provides opportunity to offer incentives to consumers based on past purchases. For example, if the wireless device receives information about past transactions, it can provide offers to the user of the wireless device to enter into transactions for complimentary goods or services. As transaction information can be obtained across many merchants, there is increased opportunity to provide offers to a consumer based on their past purchase history. Further, as merchant computing systems can provide information to wireless devices that identify the merchant, or the category of goods or services the merchant provides, the wireless device can identify one or more offers that match the merchant.

Accordingly, the embodiments disclosed herein describe a system where past line-item data from a transaction at a first merchant location can be used to provide an offer to a consumer that can be redeemed at a second merchant location. As used herein, the term merchant location can refer to unique merchants which are owned and operated by separate business entities. For example, a first merchant location can represent a particular establishment (e.g., Home Depot®), and the second merchant location can represent a second establishment (e.g., Lowe's®). The term merchant location can also refer to different physical locations which are owned and operated by the same merchant or business entity. For example, a first merchant location can represent Home Depot® of Peachtree City, Ga. and the second merchant location can represent Home Depot® of Alpharetta, Ga.

As a non-limiting example, one embodiment of the present disclosure is described in operation below. A consumer may have a wireless device such as a mobile phone that the consumer would like to use as an electronic wallet. The consumer can configure the wireless device as an electronic wallet by downloading one or more applications that allow the consumer to store card data for the consumer's financial account cards in a memory associated with the wireless device. Once the application has been downloaded, the consumer can load the card data into the wireless device and can subsequently use the card data for purchases. When the consumer uses the card data at a first merchant location, such as Home Depot®, a POS terminal at the first merchant location provides an electronic receipt to the wireless device. The wireless device can obtain line-item data such as the stock keeping unit (SKU) numbers of the products purchased in the transaction. The wireless device may then receive an offer for a discount at Lowe's, a second merchant location, for a complementary product to the product that was purchased at Home Depot®. The wireless device may compare the received offer with the line-item data and determine that the offer applies to the user of the wireless device. The wireless device can generate an alert informing the user of the offer. The wireless device may present the alert when it receives the offer, or it can present the alert when it determines the user is close to a Lowe's® location to provide an incentive for the user to enter the Lowe's® location and make a purchase.

Reference will now be made to exemplary embodiments, examples of which are illustrated in the accompanying drawings. Wherever possible, the same reference numbers will be used throughout the drawings to refer to the same or like parts.

Figure 1:
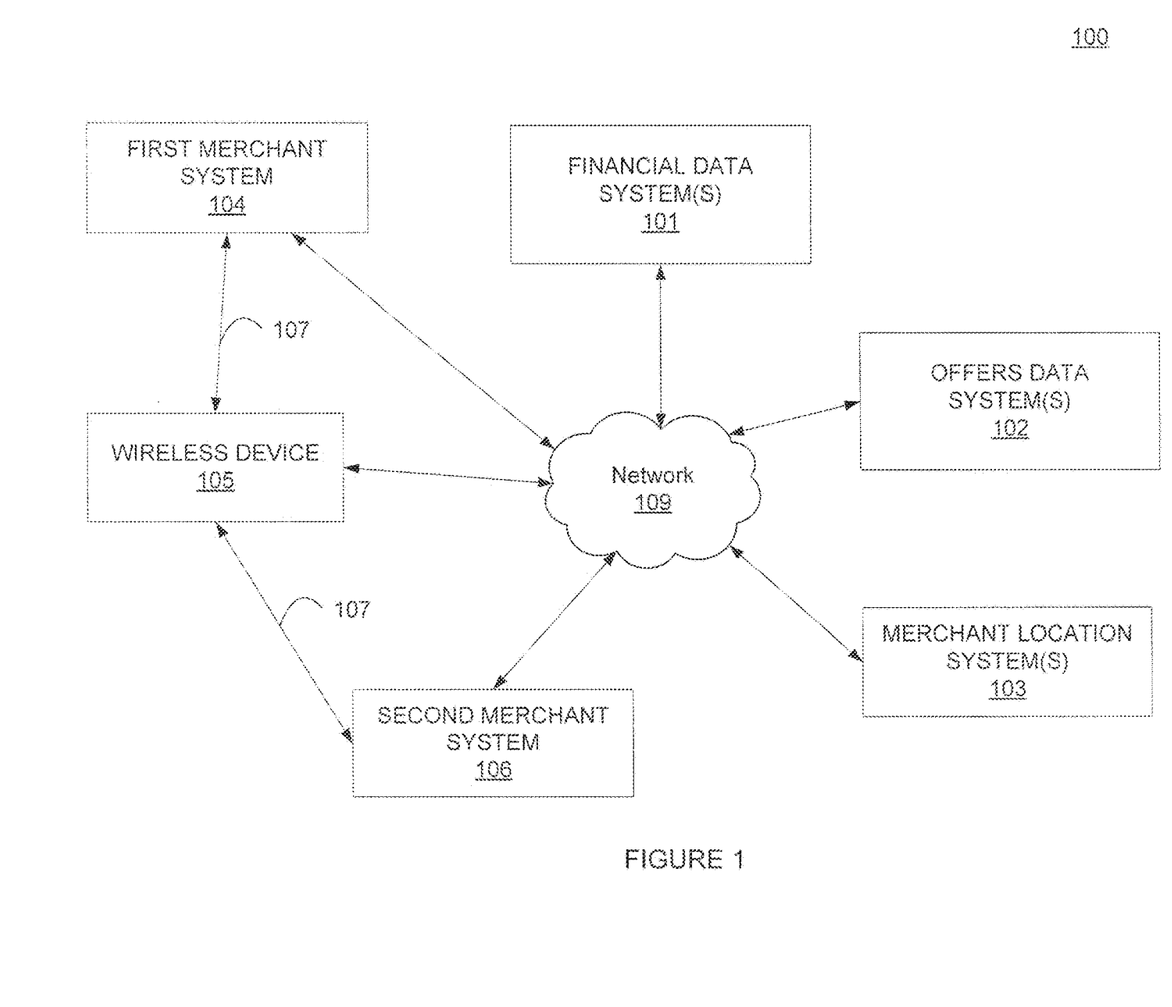
FIG. 1 shows exemplary computing systems connected via a network that can be configured to perform the operations of disclosed embodiments.

FIG. 1 shows a block diagram of an exemplary networked system 100 where a wireless device can communicate with one or more remote computing systems to perform operations consistent with the disclosed embodiments. In one embodiment, system 100 can include wireless device 105, one or more financial data system(s) 101, one or more rewards data system(s) 102, one or more merchant location system(s) 103, a network 109, and at least a first merchant system 104 and a second merchant system 106. The components and arrangement of the components included in system 100 can vary. Thus, system 100 can include fewer or additional components that perform or assist in the performance of one or more processes consistent with the disclosed embodiments.

In some embodiments, components of system 100 can include one or more computing devices (e.g., computer(s), server(s), etc.), memory storing data and/or software instructions (e.g., database(s), memory devices, etc.), and other known computing components. The one or more computing devices can include one or more processors that can be configured to execute software instructions stored on one or more memory devices to perform one or more operations consistent with the disclosed embodiments. Components of system 100 can be configured to communicate with one or more other components of system 100 via network 109, or directly with each other via direct communication means. For example, wireless device 105 can communicate with first merchant system 104 and second merchant system 106 via direct communication link 107 which can include, near field communication (NFC), RFID, WiFi, Bluetooth, LiFi, communication or any other wireless communication protocol known in the art.

Financial data system(s) 101 can be a system or systems associated with financial service providers. Financial services providers can be a business entity that provides financial account cards to consumers such as a bank, credit card issuer, or other entity that generates, provides, manages, and/or maintains financial service accounts for one or more users. Financial data system(s) 101 can generate, maintain, store, provide, and/or process financial data associated with one or more financial account cards. Financial data can include information about financial accounts including, but not limited to, issuing financial institution, card holder name, card holder address, account balance, available credit, existing fees, card expiration dates, and account transaction data (e.g., transaction dates, transaction amounts, transaction types, location of transaction, etc.).

In some embodiments, financial data system(s) 101 can provide account information to requesting computing systems, such as wireless device 105, for example. Financial data system(s) 101 can expose, in some embodiments, an application programming interface (API) that provides one or more methods for obtaining account information to requesting computing systems. For example, a requesting computing system (such as wireless device 105) can provide financial data system(s) 101 with an financial card account number via the API, and financial data system(s) 101 can provide the requesting computing system with the name, address, expiration date, issuing bank, or other information associated with the financial card account number. The account information can be provided as a binary data stream, serialized data object, XML object, or in some other data form known to those with skill in the art.

Offers data system(s) 102 can be one or more computing systems associated with one or more offer providers. An offer provider can be an entity that offers promotional items designed to entice a consumer to purchase an item from a merchant. Offers data system(s) 102 can include, in some embodiments, one or more data stores or databases that link a product identifier, such as stock keeping unit (SKU) number or inventory number of one merchant to complimentary product offer for the same, or different merchant. For example, offer data system(s) 102 may include a database or datastore that links the SKU number of a tent purchased from Big Tent Store to an offer for 35% off a tarp from Big Tent Store, an offer to purchase the same tent from Outdoor Depot 25% off, or an offer to purchase the tarp from Outdoor Depot for 50%. In some embodiments, offer data system(s) 102 can include a database or datastore that links a merchant identifier, such as a name, address, Merchant Category Code (MCC) or other merchant classifier to one or more offers. For example, offer data system(s) 102 may include a database or datastore that links the name "Big Tent Store" with an offer to purchase a sleeping bag for $50, or that links the MCC for "Sporting Goods Stores" (e.g., 5941) to an offer to purchase a backpack from Outdoor Depot for $65. According to some embodiments, offers data system(s) 102 can include a database or datastore that links a location with an offer. For example, offer data system(s) 102 can link a GPS coordinate with an offer to receive a free drink with a meal purchase at a restaurant. The offers stored by offers data system(s) 102 can be linked to more than one criterion.

For example, offer data system(s) 102 may include a database or datastore that links a MCC and location to an offer to purchase an item from a merchant that has a store at that location and that matches the MCC. In some embodiments, offers data system(s) 102 can expose an API that provides one or more methods for providing offer information to a requesting computing system. For example, a requesting computing system (such as wireless device 105) can provide offer data system(s) 102 with any combination of a product identifier, merchant identifier, MCC, or location, via the API and offers data system(s) 102 can provide the requesting computer system with one or more offers that satisfy the provided information.

According to some embodiments, merchant location system(s) 103 can be a computing system that provides merchant information based on a given location. In some embodiments, merchant location system(s) 103 can be capable of mapping geolocation data (e.g., GPS data) to merchants or MCCs. For example, merchant location system 103 can expose an API that provides one or more methods for providing merchant information to requesting computing systems. For example, a requesting computing system (such as wireless device 105) may send a request, via the API, to merchant location system(s) 103 including its current location and merchant location system(s) 103 may provide the MCC for the closest merchant, or the name, address, or other information concerning the closest merchant.

First merchant system 104 may comprise one or more computing devices configured to perform one or more operations consistent with disclosed embodiments. For example, first merchant system 104 can be a computing device that is controlled and operated by a merchant that provides products (e.g., goods and/or services), such as a restaurant (e.g., Outback Steakhouse®, Burger King®, etc.), retailer (e.g., Amazon.com®, Target®, etc.), grocery store, service provider (e.g., utility company, insurance company, financial service provider, automobile repair services, etc.), non-profit organization (ACLU™, AARP®, etc.) or any other type of entity that provides goods, services, and/or information that consumers (i.e., end-users or other business entities) can purchase, consume, use, etc. For ease of discussion, the present disclosure may describe exemplary embodiments in the context of purchase transactions involving goods from retail merchants, but first merchant system 104 is not limited to systems associated with retail merchants that conduct business in any particular industry or field. According to some embodiments, first merchant system 104 can be a mobile device (e.g., tablet, smart phone, etc.), a desktop computer, a laptop, a server or any other type of computing device. First merchant system 104 can also include a television, e-reader, or any other type of device capable of communicating with other components of system 100.

First merchant system 104 can include a POS terminal, which can be a dedicated POS terminal (e.g., POS Terminal 630 of FIG. 4, below), or a software application that can configure a general purpose computing device to accept financial account card payments. For example, the payment application can configure the general purpose computing device to interface with an input device connected to the general purpose computing system. The input device can include a terminal or port that accepts data financial account card data from wireless device 105.

In some embodiments, first merchant system 104 can provide line-item data describing the items that are included in a given transaction. For example, if wireless device 105 is used to engage in a transaction with first merchant system 104, first merchant system 104 may provide an electronic receipt to wireless device 105. The electronic receipt could be in a standard data format such as a text file, PDF file, image file, or in another data format specific to packaging and transmitting line-item transaction data.

In some embodiments, system 100 can also include second merchant system 106. Second merchant system 106 can be one or more computing devices configured to perform one or more operations consistent with disclosed embodiments in a manner similar to that described above with respect to first merchant system 104. As used herein, second merchant system 106 can be a computing system associated with the entity that controls and operates first merchant system 104, but a different location. For example, first merchant system 104 can be a system associated with a Big Supermarket merchant location in Roswell, Ga. and second merchant system 106 can be a system associated with a Big Supermarket merchant location in Atlanta, Ga. In some embodiments, second merchant system 106 can be a computing system associated with a different entity than the entity that controls and operates first merchant computing system 104. For example, first merchant system 104 can be controlled and operated by Big Tent Store and second merchant system 106 can be controlled and operated by Outdoor Depot.

System 100 can also include, in some embodiments, wireless device 105. Wireless device 105 can be any consumer device configured for wireless communications consistent with the embodiments described herein. For example, wireless device 105 can include a mobile phone, personal digital assistant (PDA), tablet computing device, laptop computing device, smart card, or any other computing device configured to communicate wirelessly with one or more computing systems. In some embodiments, wireless device 105 can be configured to communicate wirelessly using Bluetooth, Wi-Fi, NFC, and cellular technologies such as CDMA, TDMA, LTE, GSM, for example.

Network 109 may be any type of network configured to provide communications between components of system 100. For example, network 109 can be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 can communicate directly through one or more dedicated communication link(s), such as link 107.

Figure 2:
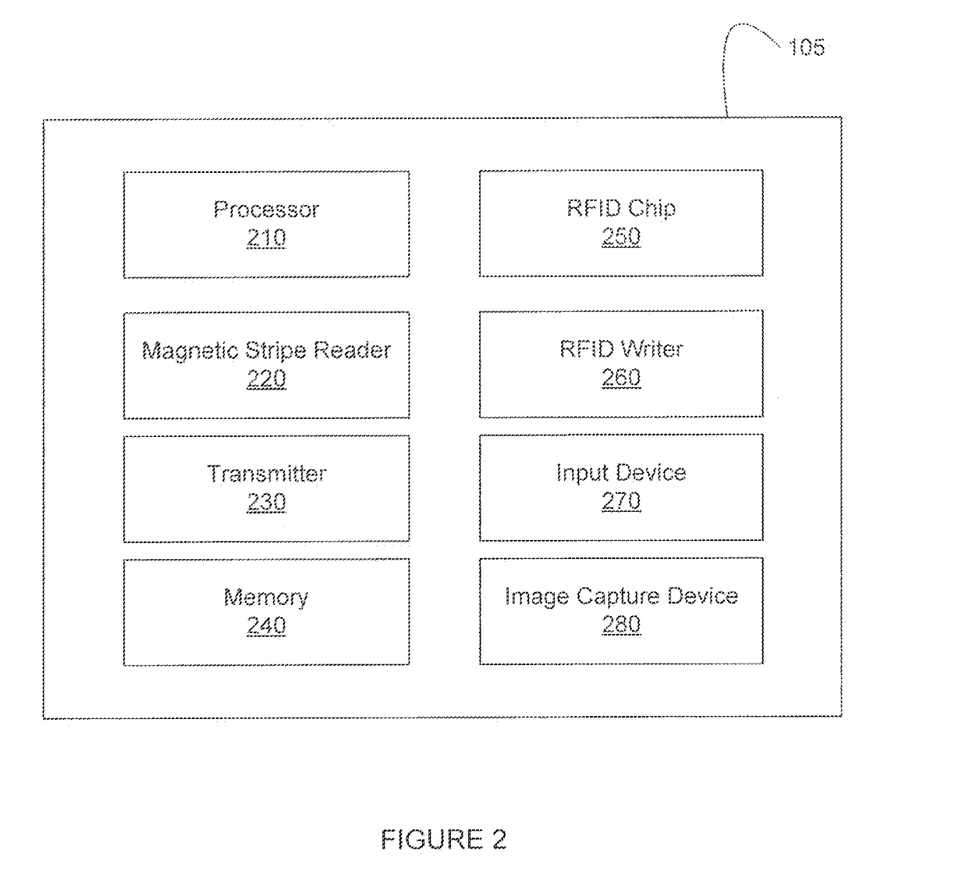
FIG. 2 is an exemplary block diagram of the components of a wireless device.

FIG. 2 shows a block diagram of the components of wireless device 105 according to one embodiment. For example, wireless device 105 may include a processor 210, a magnetic stripe reader 220, a transmitter 230, a memory 240, an RFID chip 250, an RFID writer 260, an input device 270, and an image capture device 280. Other components that may be included in wireless device 105 include a battery (not shown) for supplying power to transmitter 230 and RFID chip 250. Furthermore, wireless device 105 may include a sensor (not shown) for detecting the presence of a card. Still further, wireless device 105 may include a smart card reader (not shown) in addition to, or in place of, magnetic stripe reader 220. Wireless device 105 may also include a display, and in some cases a touch sensitive display.

In some embodiments, processor 210 may instruct magnetic stripe reader 220 to read card data from a card as it is inserted into wireless device 105. Alternatively, a smart card reader included in wireless device 105 may read data from the card. Further, card data that has been read from a card may be stored in memory 240 or may be written by RFID writer 260 to RFID chip 250. Transmitter 230 may be used in addition to RFID chip 250 to transmit card data and/or other data from wireless device 105. For example, transmitter 230 may be used to boost the signal strength of radio frequency signals sent from wireless device 105.

In some embodiments, card data from a card can be input to wireless device 105 using input device 270. For example, input device 270 can include a keypad or touchscreen configured to receive input from a user, and processor 210 may interpret data received by the input device 270 as card data which is stored in memory 240 or the RFID chip. Wireless device may also capture card data from a card using image capture device 280 which can include a camera, optical sensor, infrared sensor or other sensor configured to capture an image. Once an image of a card is captured by image capture device 280, processor 210 can store the card data in memory or write it to RFID Chip 250 using RFID writer 260.

In some embodiments, wireless device 105 can be used to purchase goods or services in a wireless transaction. During a transaction, a user may make a secured payment with wireless device 105. In such a transaction, card data stored on wireless device 105 may be transmitted by, for example, RFID chip 250 to a nearby RFID reader associated with a merchant, such as first merchant system 104 or second merchant system 106. As wireless device 105 may be capable of storing card data for one or more financial account cards, wireless device 105 can also act as an electronic wallet.

A user of wireless device 105 may also store data for multiple cards by providing a first card to wireless device 105 so that the device may store the card data from the first card in memory 240. The user may then provide a second card to wireless device 105 which is also stored in memory 240. After a user has stored card data for more than one card in wireless device 105, the user may select a card from a menu screen shown on a display of wireless device 105, such as the menu screen shown in FIG. 7 and described in further detail below. In some embodiments, wireless device 105 may suggest a stored card or default the selection of the card on displayed menu based on user preferences, data describing the transaction for which the card will be used, or based on an offer presented by wireless device 105 consistent with embodiment disclosed herein.

Wireless device 105 may also include security features that authorize a transaction. For example, a security validation may be required for transactions to prevent unauthorized use of card data stored in memory 240. Further, card data may be encrypted using encryption techniques so that transmitted card data cannot be intercepted in an accessible form.

Figure 3:
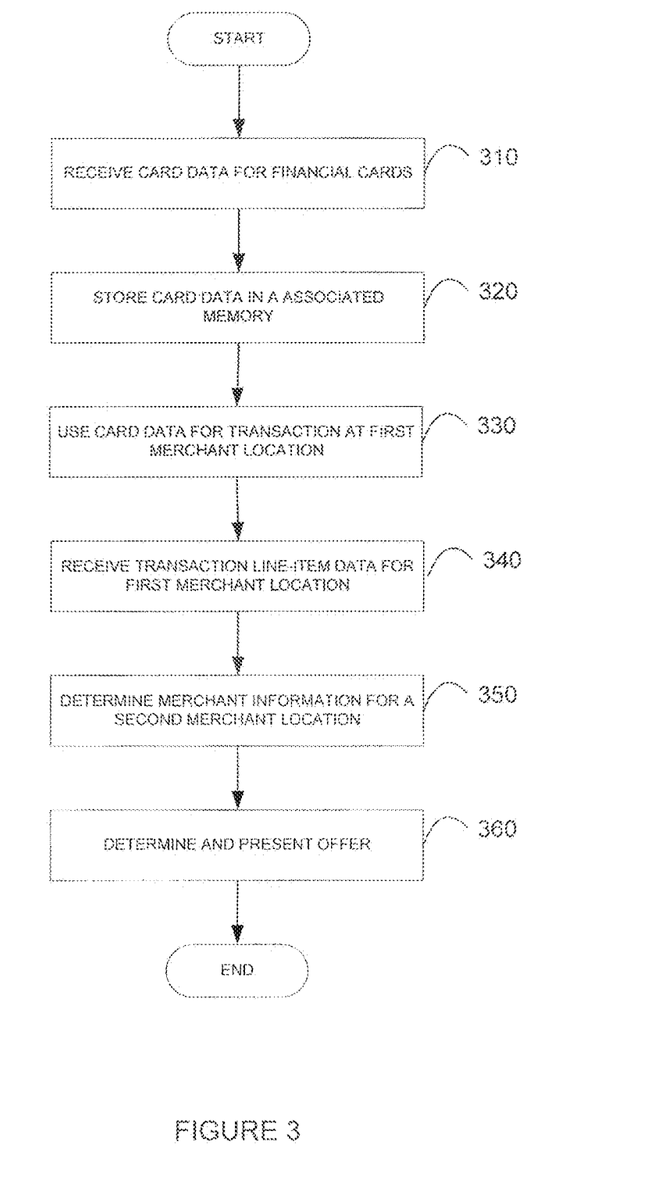
FIG. 3 is an exemplary flow diagram of a process for providing offers.

FIG. 3 shows an exemplary flow diagram of a process 300 for providing offers to a consumer using a wireless device, such as wireless device 105. As described in more detail below, process 300 can be performed by wireless device 105 to present offers to a consumer based on line-item data received from a first merchant location (e.g., from first merchant system 104) and the location of wireless device 105. The offer may be related to goods or services available a second merchant location and could include an incentive to use wireless device 105 to purchase the goods or services at the second merchant location (e.g., using second merchant system 106).

Process 300 begins when wireless device 105 receives card data for one or more financial account cards (Step 310).

In some embodiments, wireless device 105 receives the card data via a card reader that is part of wireless device 105 or attached as a peripheral to wireless device 105 consistent with present embodiments. According to some embodiments, wireless device 105 receives the card data via one of its associated input/output devices such as a touchscreen, keypad, or camera. For example, a user of wireless device 105 may manually enter an account number associated with the financial card, or the user may take a picture of the card with a camera included in or in communication with wireless device 105, and OCR capable software installed on wireless device 105 may extract the card data. In some embodiments, wireless device 105 may communicate with one or more remote computer systems to obtain additional card data that is not stored directly on a financial account card. For example, wireless device 105 may communicate with one or more remote computer systems to obtain the identity of the financial institution that issued the financial account card, branding associated with the card, the name and address of the account holder of financial account card, etc.

Figure 4:
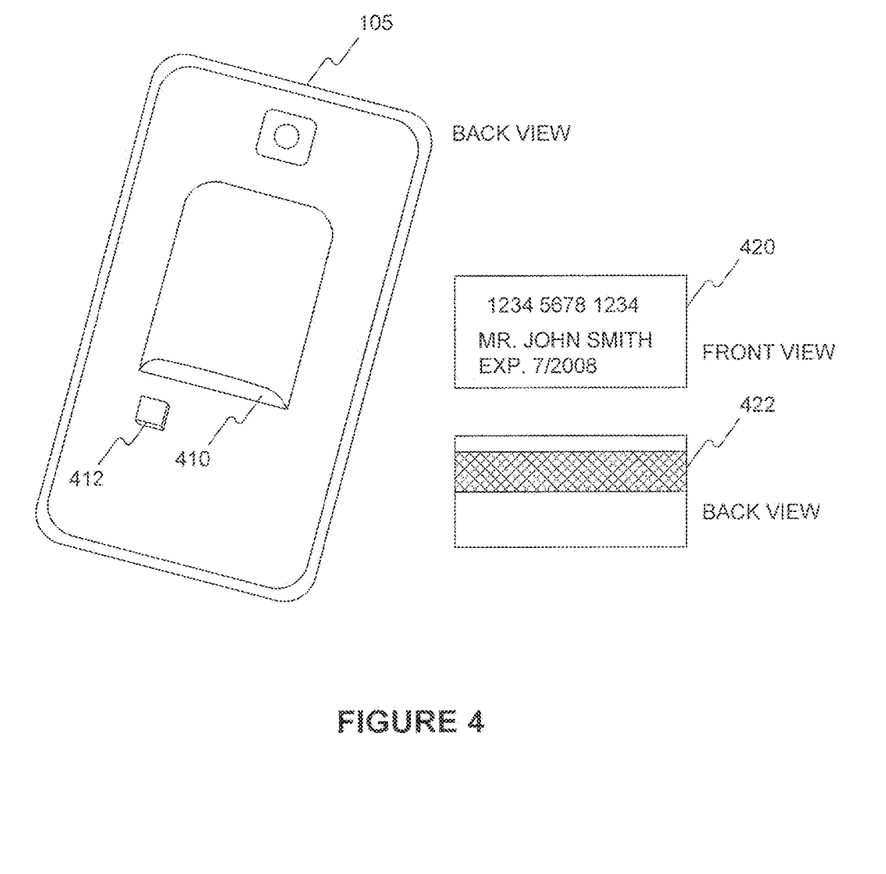
FIG. 4 shows an exemplary wireless device including a card slot for inserting a financial account card.

In some embodiments, wireless device 105 may receive the card data through a dedicated card reader attached to, or part of, wireless device 105 as shown in FIG. 4. FIG. 4 shows a back view of an embodiment of wireless device 105 including a card slot 410 for inserting a card 420 and an eject button 412. According to the example shown in FIG. 4, wireless device 105 is preferably a mobile phone. However, wireless device 105 may be a PDA, or other handheld device, such as a Blackberry. Although wireless device 105 shows card slot 410 on the back of the device, card slot 410 may be incorporated into any appropriate location of wireless device 105. Further, card slot 410 may be oriented in any appropriate direction for receiving card 420. In exemplary embodiments, card slot 410 may include a reader (not shown) for reading card data on card 420. Further, in some embodiments, wireless device 105 may not include card slot 410 and instead can receive card data via input devices such as a touchscreen, keypad, or camera. For example, a user of wireless device 105 may manually enter an account number associated with the financial card, or the user may take a picture of the card with wireless device's 105 camera, and OCR capable software installed on wireless device 105 may extract the card data.

Card 420 may be a financial account card, such as a credit card, a debit card, a smart card, an ATM card, or any other card associated with a financial account and that may be used to make purchase transactions. Card 420 includes, for example, account information such as information identifying the card holder, an account number, and expiration date. Further, as shown in FIG. 4, according to the back view of card 420, card 420 includes magnetic stripe 422. In the case of a smart card, card 420 will include a smart card chip (not shown), which may be read by a smart card reader included in wireless device 105 in addition to, or instead of, a reader to read magnetic stripe 422.

According to some embodiments, once card 420 is inserted into wireless device 105, a mechanism (not shown) may hold card 420 in place such that it does not fall out of wireless device 105. Furthermore, wireless device 105 may include eject button 408 for removing card 420 from wireless device 105. For example, when a user desires to remove card 420 from wireless device 105, the user may press eject button 408, which ejects card 420 through card slot 410.

Figure 5:
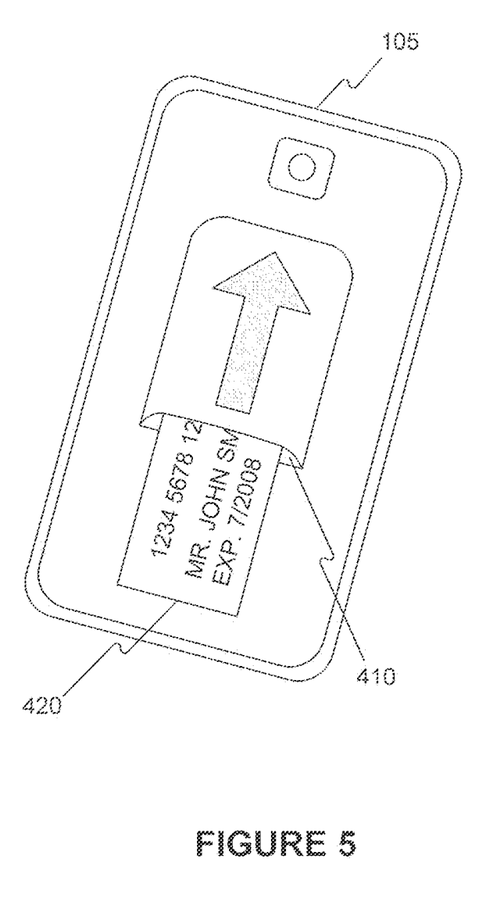
FIG. 5 shows an example of a financial account card being inserted into the card slot of the wireless device shown in FIG. 4.

FIG. 5 shows card 420 being inserted into card slot 410 of wireless device 105. When card 420 is inserted into card slot 410 of wireless device 105, a magnetic stripe reader (not shown) may read card data stored on magnetic stripe 422. Alternatively, card 420 may include a smart card chip, which may be reader by a smart card reader (not shown) included in wireless device 105. Card data may be stored in a memory of wireless device 105 (e.g., memory 240) or may be used to program an RFID chip included in wireless device 105 (e.g. RFID Chip 250).

Returning to FIG. 3, once wireless device 105 receives the card data, it can store the card data in memory (Step 320) associated with wireless device 105. In some embodiments, wireless device 105 may store the card data in a local memory (e.g., memory 240), or program a RFID chip of wireless device 105 (e.g., (e.g. RFID Chip 250). According to some embodiments, wireless device 105 can store the card data in remote memory accessible by wireless device 105. For example, the card data can be stored via a cloud computing service to a cloud based storage device.

Figure 6:
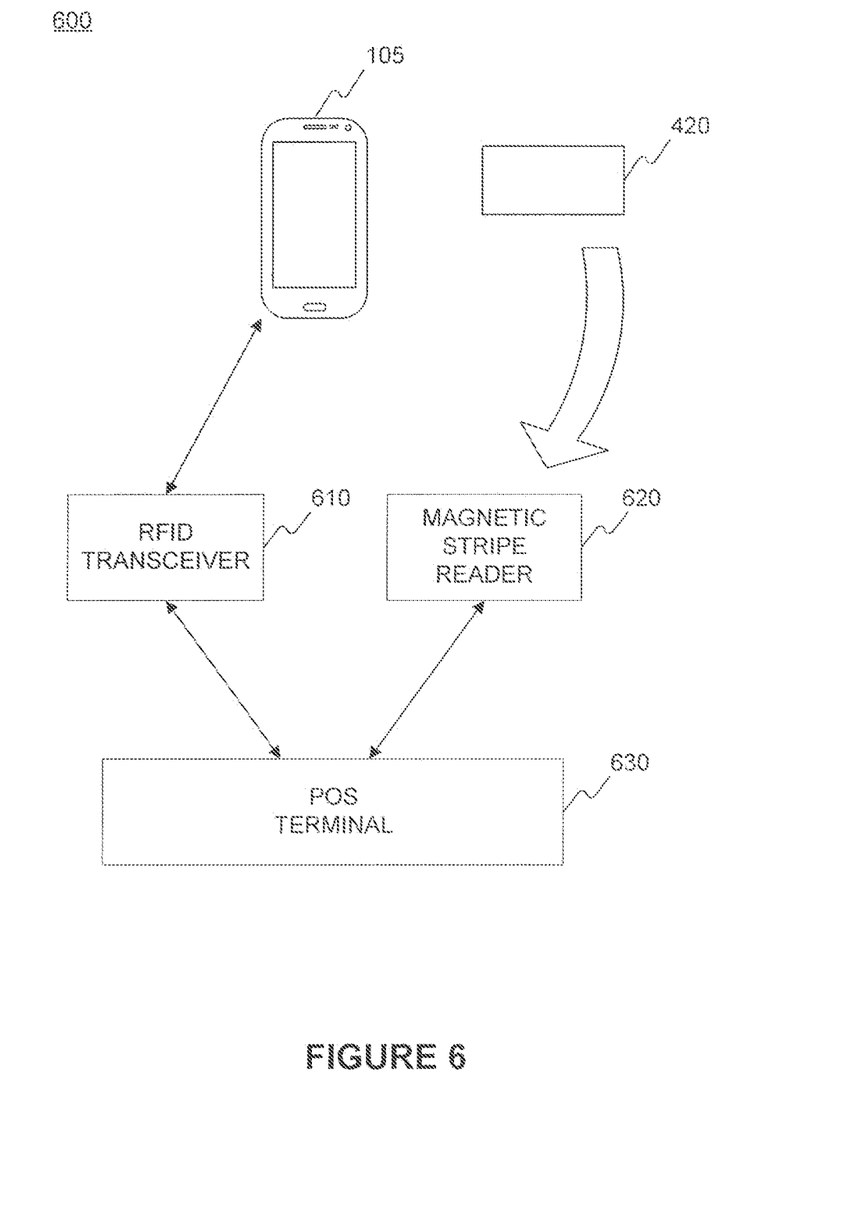
FIG. 6 is an exemplary diagram showing the interaction between a wireless device and a POS terminal.

Once the card data is stored, a user of wireless device 105 may use the card data in a transaction at a first merchant location (Step 330). According to some embodiments, wireless device 105 can be configured to communicate with a computing system of a merchant (e.g., first merchant system 104, second merchant system 106). The computing system of the merchant may include a POS terminal. FIG. 6 shows one embodiment of wireless device 105 communicating with POS terminal 630, which may, in some embodiments, be part of a computing system of a merchant (e.g., first merchant system 104, second merchant system 106). FIG. 6 shows an exemplary diagram 400 of an interaction between wireless device 105, an RFID transceiver 610, and a magnetic stripe reader 620, according to some embodiments. RFID transceiver 610 and magnetic stripe reader 620 may be connected to POS terminal 630, or be part of POS terminal 630. POS terminal 630 receives data from RFID transceiver 410 and/or magnetic stripe reader 420 to process a transaction. A merchant may use POS terminal 630 to input data describing a purchase and to verify payment information obtained by RFID transceiver 610 and/or magnetic stripe reader 620.

Once POS terminal 630 has received payment information, such as account information for a credit card, POS terminal 630 may transmit the payment information in a secure format over a network (not shown) in a process that is consistent with a typical purchase transaction, such as that involving a credit card. In such a credit card transaction, for example, once an external server (not shown) verifies and approves the credit card transaction, authorization for the transaction may be sent over the network to POS terminal 630.

As shown in FIG. 6, wireless device 105 may also transmit card data by radio frequency to RFID reader 610. In such a situation, a user will hold wireless device 105 near RFID transceiver 610 at, for example, the direction of the merchant or after being prompted by a message shown on a display (not shown) of RFID transceiver 610 requesting the user to provide payment information. Although FIG. 6 shows POS terminal 630 as including RFID transceiver 610 to receive card data from wireless device 105 via wireless communication, in other embodiments, POS terminal 630 can include additional or alternative readers configured to receive wireless data. For example, POS terminal 630 can include a Bluetooth, WiFi, NFC, RF or other transceiver capable of receiving wireless communications.

Figure 7:
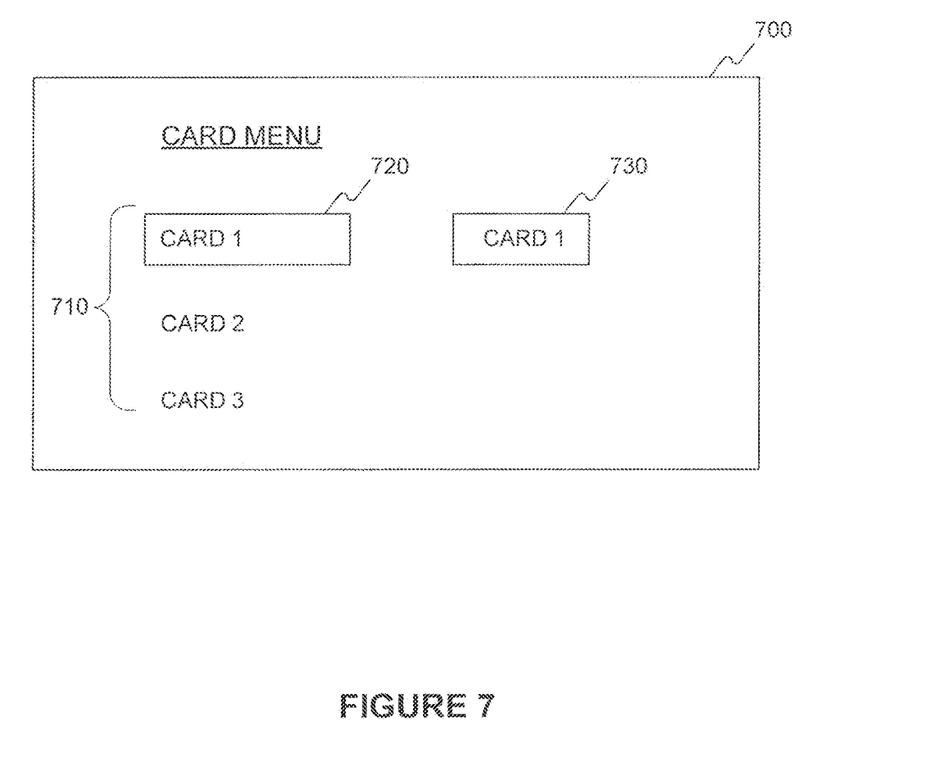
FIG. 7 is an exemplary menu of stored cards that is shown on a display of a wireless device; and, FIG. 8 is an exemplary flow diagram of a process for selecting a card to provide a payment for a purchase made using a wireless device.

In some embodiments, wireless device 105 may have stored in its associated memory more than one financial account card requiring a selection of a card for use in a transaction. Accordingly, in some embodiments, wireless device 105 may generate a user interface on its display to facilitate the selection of stored card data for the transaction. FIG. 7 shows an exemplary display 700 of wireless device 105, which may include a menu 710 of financial cards for which wireless device 105 has stored card data. As shown in FIG. 7, menu 710 may include a list of three cards designated as card 1, card 2, and card 3. Further, card 1 is shown as having been selected by selection box 720. Selection box 720 may be, for example, a highlighted border surrounding a selected item shown on display 700. A user may make a selection from menu 710 by using input keys (not shown) of wireless device 105, or by touching display 700. Furthermore, as shown in the exemplary embodiment of FIG. 7, card 1 may also be represented by image 730, which shows a graphical image of a card. Alternatively, card 1 may be selected for use in making a purchase by selecting image 730 using input keys or by touching display 700. Image 730 may be an image of a credit card, a logo, text, or any graphical image that the user has associated with card 1.

For example, a user may access menu 710 on wireless device 105. As shown in FIG. 7, menu 710 displays one or more cards that have card data stored in wireless device 105. The user may select a card, such as card 1, by using input keys, for example, from menu 710. Alternatively, the user may select card 1 by selecting image 730. Thereafter, the user may use wireless device 105 to make a purchase with card 1. A user may therefore make selections from menu 710 to select a particular card for a transaction.

In some embodiments, security features, such as authorization, may be used to determine whether a transaction may proceed with a selected card. For example, in some embodiments, a security code may be required before a selected card may be used to make a transaction. When a user selects the card for making a purchase, a prompt may require the user to enter a security code to authorize use of the card data. Once entered, wireless device 105 may determine whether the correct security code has been entered by comparing the entered code with a code stored in memory 240 of wireless device 105. For example, the security code may be stored in an encrypted form in wireless device 105. After validating the security code, wireless device authorizes the use of the card data and wireless device 105 transmits the card data from wireless device 105 to the POS terminal. For example, card data may be transmitted from wireless device 105 to a nearby RFID reader. The RFID reader may be included in and/or connected to a POS terminal, as shown in FIG. 4. Further, the security code may be entered by the user via input keys on wireless device 105. Alternatively, the security code may be entered by the user at the POS terminal and transmitted over a network to an external server for validation. The security code may be a personal identification number (PIN). In other embodiments, instead of a security code, authorization may be provided by a fingerprint, voice print, or retinal scan of the user. Also, in any of the above embodiments, the security code may be received by wireless device 105 or by a POS terminal.

Figure 8:
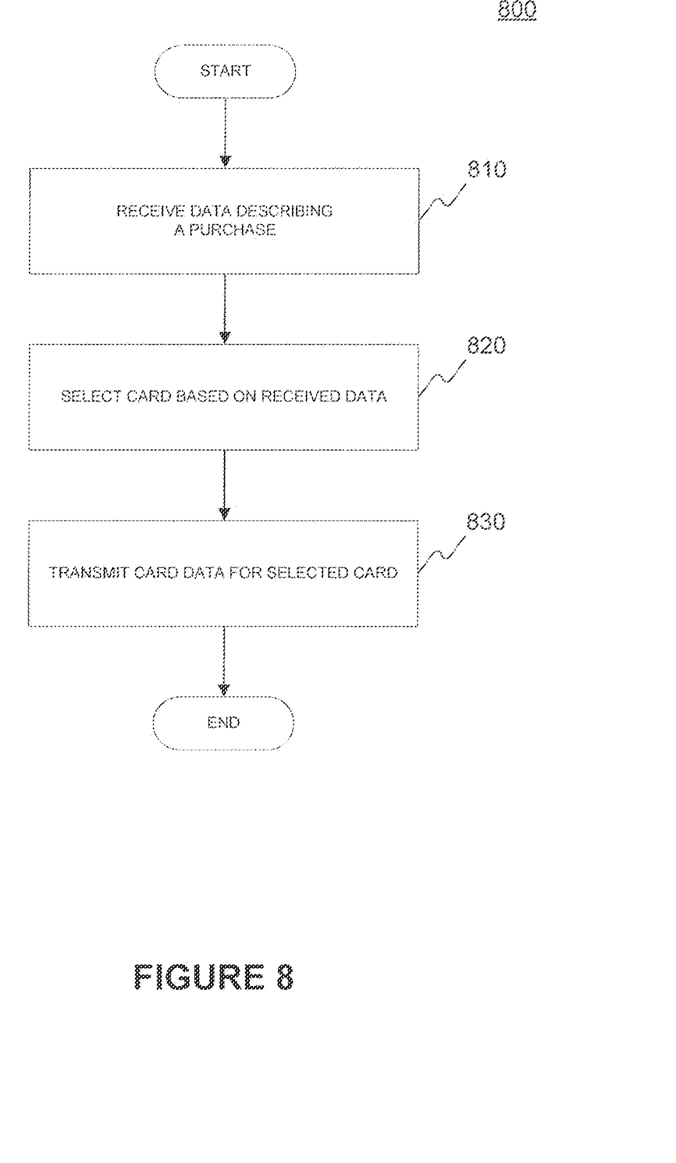

In some embodiments, wireless device 105 may select or recommend card data for a transaction. FIG. 8 shows an exemplary flow diagram 800 of a process for selecting a card for a transaction using wireless device 105. In step 810, wireless device 105 may receive from a POS terminal associated with a merchant (e.g., POS terminal 630), data reflecting a transaction. The data reflecting the transaction can include the MCC of the merchant that operates the POS terminal, the line-item data for goods or services that are part of the transaction, or data indicating a financial institution affiliated with the merchant. Using the received data reflecting the transaction, wireless device 105 may automatically select a card to provide the payment for the purchase. (Step 820.) For example, the selection may be based on rewards benefit information associated with the card data, or a user preference stored with the card data indicating that the card data is to be used for certain purchases. For example, a user might provide a preference to wireless device 105 that a card data from a first financial card by used with gas purchases and card data from a second financial card be used with grocery purchases. Using the preferences and the received data reflecting the transaction, wireless data may automatically select or recommend the appropriate card data. Next, wireless device 105 transmits via radio frequency card data for the selected card to POS terminal 630. (Step 830.)

Returning to FIG. 3, during or after the transaction, wireless device 105 may receive line-item data for the first merchant location (Step 340). The line-item data may be received by wireless device 105 as an electronic receipt, for example. The line-item data can include a text description of the goods or services purchased during the transaction, a SKU number for the goods or services, the price of the goods or services. The line-item data can also include, in some embodiments, an associated MCC that is typical of the good or service purchased. For example, if the line-item data includes a purchase of a laptop, the line-item data can include the MCC for electronic stores (e.g., 5732). In some embodiments, the line-item data may be associated with the MCC of the merchant at which the transaction associated with the line-item data occurred. For example, if a user used wireless device 105 to purchase an item from an auto parts store, all the goods purchased in the transaction may be associated with MCC 5533 (Automotive Parts and Accessories Stores).

In some embodiments, wireless device 105 will determine merchant information for a second merchant location (Step 350). The merchant information can include, for example, a MCC for the second merchant location, or it could be an identifier for the second merchant location such as, for example, the address of the second merchant location, a text description of the second merchant location, or GPS coordinates for the second merchant location. According to some embodiments, the merchant information for the second location can be used by wireless device 105 to determine one or more offers (Step 360) to present to a user of wireless device 105, and the merchant information may depend on the information that a remote computer system, such as offers data system 102, would need to provide one or more offers to wireless device 105 for later presentation to a user. In some embodiments, offers data system 102 may expose an API that provides one or more offers when given a MCC, or offers data system 102 may expose an API that provides one or more offers when it receives a geographic location. For example, offers data system 102 may provide an offer for a discount off of a printer when provided with a MCC corresponding to an electronics retailer, or offers data system 102 may provide an offer for a free drink at a restaurant when provided with the address or GPS coordinates of the restaurant.

In some embodiments, merchants may broadcast merchant information using one or more computing systems at their merchant location. For example, a merchant's POS may be configured to communicate with wireless devices using RFID, WiFi, Bluetooth, LiFi, or any other wireless communication protocol known in the art, and the POS may continuously broadcast a message to wireless devices configured to receive the message to communicate the merchant information to wireless device 105. In some embodiments, the merchant information includes a MCC that classifies the type of merchant. According to some embodiments, wireless device 105 may include a lookup table that maps MCCs to merchant types. For example, wireless device 105 may include a lookup table that links the MCC "5411" with "Grocery Stores, Supermarkets" and when wireless device 105 receives a 5411 as a MCC for a particular transaction, wireless device 105 can use the lookup table to determine that the transaction is taking place at a grocery store or supermarket.

In some embodiments, wireless device 105 may determine information for a second merchant location based on its current location (Step 350). For example, when wireless device 105 is at the second merchant location, it may use its current location (e.g., GPS coordinates). According to some aspects, wireless device 105 uses location services to determine the merchant information for the second merchant location. For example, wireless device 105 may communicate with a computer system, such as merchant location system(s) 103, which is capable of mapping geolocation data (e.g., GPS data) to merchants or MCCs. When determining second merchant information, wireless device 105 may send a request including the wireless device's current location to one or more remote computer systems. In response to the request, wireless device 105 may receive a MCC and/or the name for the closest merchant corresponding to the location of wireless device 105. Wireless device 105 may use a lookup table mapping the received MCC to a merchant type which wireless device 105 can later use to determine offers (e.g., at Step 360). In some embodiments, wireless device 105 may receive in response to the request the merchant type directly from the computer system capable of mapping geolocation data and in such embodiments, may not use a lookup table.

Once wireless device 105 receives line-item data for a first merchant location (e.g., at Step 340) and determines merchant information for a second merchant location (e.g., at Step 350), wireless device 105 can determine one or more offers to present to the user (Step 360). Wireless device 105 may determine the offers based on the line-item data, the merchant information, the wireless device's current location, time of day, or a combination of the line-item data, the merchant information, time of day, and the wireless device's current location, among other parameters. In some embodiments, wireless device 105 communicates the line-item data, the merchant information, and/or the wireless device's current location to a remote computer system that provides offers (e.g., offer data system(s) 102) and receives data corresponding to one or more offers to present to the user of wireless device 105. For example, wireless device 105 may have line-item data indicating that the user of wireless device 105 recently purchased a suit, and wireless device 105 may have also received merchant information for a second merchant location that sells shoes. Wireless device 105 can then communicate the line-item data and the merchant information for the second location to the offer data system(s) 102, and in response, wireless device 105 may receive an offer to buy shoes at a discount.

In some embodiments, the offers received by wireless device 105 (or as described below, determined by wireless device 105) may be for products that are complementary to products described in the line-item data. Complementary products can include products of a different type that are typically purchased with the products described in the line item data, such as, for example, a suit and a pair of shoes as described above. The offers can also be determined based on dayparting, where a product offers are presented to a user of wireless device 105 based on the time of day. For example, if the line-item data indicates that the transaction occurred in the evening, the offer may include a discount for dinner at a restaurant near the current location of wireless device 105 or the location of the purchase. In some embodiments, the offer may be based on dayparting and the type of product purchased. For example, a user may purchase a cup of coffee at a coffee shop in the morning, after which the wireless device can receive (or determine as described below) an offer for a discount to purchase doughnuts at a near-by doughnut shop based on the purchase of coffee (product type) and the time of day (morning). The complementary product may vary depending on the time of day, for the same purchased product. For example, if the user purchased the coffee at night, the offer might be for a piece of cake at a bakery as opposed to a doughnut.

In some embodiments, wireless device 105 may determine offers based on a list of available offers that a remote computer system, such as offers data system(s) 102, provides to it. For example, offers data system(s) may provide data representing offers to wireless device 105 on a periodic basis such as hourly, daily, or weekly. When wireless device 105 receives the offers, it may reference stored line-item data from past transactions to determine if any of the offers apply. From the list of applicable offers, wireless device 105 may then determine if any received merchant information for a second location applies and then present that offer on wireless device 105 when wireless device 105 is at or near the second merchant location. For example, a user may use wireless device 105 to purchase a tennis racket from a Sports & Stuff. During the purchase transaction, wireless device 105 receives line-item data (e.g., the tennis racket's SKU and/or the MCC for Sporting Goods Stores) from the computing system of the merchant where the tennis racket was purchased. After purchasing the tennis racket, offer data system(s) 102 may provide a list of offers including an offer for 25% off a television at Big Electronics Store, a buy-one-get-one free offer for Jitterbug Coffee Shop, and an offer for 50% off a gross of tennis balls from Sports & Stuff. The list of offers may be coded with MCC's or associated SKUs for complimentary goods or services. Once wireless device 105 receives the list of offers, it may compare the offers to its stored line-item data and determine a match for the user for the offer to purchase the tennis balls based on the past purchase of the tennis racket.

According to some embodiments, wireless device 105 may present offers as soon as it determines the offers. For example, once wireless device 105 receives an offer applicable to the stored line-item data and merchant information, it may generate an alert for the user of wireless device 105. In some embodiments, it may store the offer in a location queue and when wireless device 105 is close to a second merchant location where the user can redeem the offer, it may then generate an alert notifying the user of the offer. In some embodiments, wireless device 105 may generate an initial alert for the user when it receives or determines the offer, and a subsequent reminder alert when the user is close to the merchant location where the user can redeem the offer. The foregoing descriptions have been presented for purposes of illustration and description. They are not exhaustive and do not limit the present embodiments to the precise form disclosed. Modifications and variations are possible in light of the above teachings or may be acquired from practicing of embodiments. For example, the described implementation includes software but other embodiments may be implemented as a combination of hardware and software or in hardware alone.

Additionally, although aspects of the present embodiments are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

Other embodiments will be apparent to those skilled in the art from consideration of the specification and practice of the embodiments disclosed herein. The specification and examples should be considered as exemplary only.

What is claimed is:

1. An offer system, comprising:
    a computing system configured to receive over a communication network:
        transaction data for at least one prior transaction associated with a user of a wireless device; and
        information indicating a current location of the wireless device;
    one or more processors configured to execute programmable instructions to:
        determine an offer based on the received information indicating the current location of the wireless device and the transaction data for the at least one prior transaction associated with the user of the wireless device,
        wherein the offer is redeemable at a merchant location within a predetermined distance of the current location of the wireless device, and
        wherein the computing system is further configured to transmit, over the communication network, the determined offer to the wireless device.

2. The system of claim 1, wherein one or more processors are further configured to provide an application programming interface (API) to a requesting computer system.

3. The system of claim 2, wherein one or more processors are further configured to receive the transaction data via the API.

4. The system of claim 3 wherein the transaction data includes: a product identifier, a merchant identifier, the current location, and a merchant category code.

5. The system of claim 4, wherein the one or more processors are further configured to determine the offer satisfying the transaction data.

6. The system of claim 4, wherein the one or more processors are further configured to map the current location of the wireless device to the merchant category code of the merchant location.

7. The system of claim 1, further comprising a database storing information for a plurality of merchants.

8. The system of claim 7, wherein the one or more processors are further configured to identify the offer based on a comparison of the subset of offers from the database.

9. The system of claim 7, wherein the one or more processors are further configured to communicate with the database to determine the merchant location that is within the predetermined distance of the current location of the wireless device.

10. They system of claim 7, wherein the one or more processors are further configured to query the database based on the GPS data received from the wireless device to determine the merchant location that is within the predetermined distance of the current location of the wireless device.

11. A method comprising:
    receiving over a communication network:
        transaction data for at least one prior transaction associated with a user of a wireless device; and
        information indicating a current location of the wireless device;
    determining an offer based on the received information indicating the current location of the wireless device and the transaction data for the at least one prior transaction associated with the user of the wireless device, wherein the offer is redeemable at a merchant location within a predetermined distance of the current location of the wireless device; and
    transmitting, over the communication network, the determined offer to the wireless device.

12. The method of claim 11, wherein transaction data includes: a product identifier, a merchant identifier, the current location, and a merchant category code.

13. The method of claim 12, further comprising determining the offer satisfying the transaction data.

14. The method of claim 11, further comprising mapping the current location of the wireless device to the merchant category code of the merchant location.

15. The method of claim 11, further comprising identifying the offer based on a comparison of the subset of offers.

16. A non-transitory medium storing instructions that, when executed by one or more processors, cause the one or more processors to perform operations comprising:
    receiving over a communication network:
        transaction data for at least one prior transaction associated with a user of a wireless device; and
        information indicating a current location of the wireless device;
    determining, an offer based on the received information indicating the current location of the wireless device and the transaction data for the at least one prior transaction associated with the user of the wireless device, wherein the offer is redeemable at a merchant location within a predetermined distance of the current location of the wireless device; and
    transmitting, over the communication network, the determined offer to the wireless device.

17. The non-transitory medium of claim 16, wherein transaction data includes: a product identifier, a merchant identifier, the current location, and a merchant category code.

18. The non-transitory medium of claim 17, further comprising determining the offer satisfying the transaction data.

19. The non-transitory medium of claim 16, further comprising mapping the current location of the wireless device to the merchant category code of the merchant location.

20. The non-transitory medium of claim 16, further comprising identifying the offer based on a comparison of the subset of offers.

* * * * *